(12) United States Patent
Hildebrandt

(10) Patent No.: US 6,407,867 B1
(45) Date of Patent: Jun. 18, 2002

(54) MULTIPLE BEAM SPACER WITH A BEAM SPLITTER CUBE AND TWO ROOF MIRRORS

(75) Inventor: Michael Hildebrandt, Northridge, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/724,838

(22) Filed: Nov. 28, 2000

(51) Int. Cl.⁷ ............................ G02B 27/14; B41J 2/455
(52) U.S. Cl. ................. 359/629; 359/638; 359/850; 359/834; 359/627; 359/204; 347/233; 347/238
(58) Field of Search ................. 359/204, 618, 359/627, 629, 634, 636, 638, 639, 640, 834, 836, 850, 855; 347/233, 238; 358/482, 494

(56) References Cited

U.S. PATENT DOCUMENTS

| | | | | |
|---|---|---|---|---|
| 4,686,542 A | * | 8/1987 | Yip et al. | |
| 4,953,950 A | * | 9/1990 | Arata et al. | |
| 4,960,320 A | * | 10/1990 | Taniura | |
| 5,272,715 A | * | 12/1993 | Gueran | |
| 5,519,432 A | | 5/1996 | Genovese | 347/260 |
| 5,557,475 A | | 9/1996 | Nightingale et al. | 359/831 |
| 5,566,024 A | | 10/1996 | Rauch | 359/571 |
| 5,867,318 A | * | 2/1999 | Curdier et al. | |

\* cited by examiner

Primary Examiner—Ricky D. Shafer
(74) Attorney, Agent, or Firm—William Propp

(57) ABSTRACT

A beam splitter cube and two roof mirrors are used as a beam spacer to interlace and closely space four parallel laser beams.

1 Claim, 1 Drawing Sheet

MULTIPLE BEAM SPACER WITH A BEAM SPLITTER CUBE AND TWO ROOF MIRRORS

BACKGROUND OF THE INVENTION

The present invention relates to a multiple beam spacer and, more particularly, to a beam splitter cube and two roof mirrors which control the separation between four parallel laser beams.

Printing systems will use a raster output scanning (ROS) system to have a modulated light beam strike the facets of a rotating polygon mirror and scan in a raster pattern across a photoreceptor. High speed or color printing requires a multiple beam light source.

One possible multiple beam light source is a laser diode array. However, placing two or more laser diodes in a single array creates practical difficulties including phase locking of the emitted laser beams and electrical and thermal interference between the adjacent laser beams.

Another approach to providing a multiple beam light source is to integrate individual laser diodes to form the multiple light beam source. In a ROS system, it is beneficial to have the rotating polygon as thin as possible. Thicker polygons cost more and require larger, higher power and more expensive motors and drivers. A four parallel beam ROS therefore requires that the four beams be closely spaced in order to enable a thin polygon.

The major problem with integrating individual laser diodes into a multiple beam light source is the large spacing between the individual laser diodes caused by the physical size of the laser diodes themselves. The spacing or pitch between two adjacent individual laser diodes can be 100 microns or larger while the required spacing of the two adjacent light beams for printing uses is 25 microns or less, a difference of a factor of four or greater. Also multiple laser beam systems are often required to have beam to beam spacing that is considerably different in different parts of the system.

A beam spacer uses optical elements to expand or contract the pitch or spacing between light beams.

Current technology can use mirrors and lenses as beam spacers. However, manufacturing these optical elements on such a small micron scale requires expensive, extensive fabrication and aligning the various optical elements on an even smaller scale mandates a precision assembly.

Beam combiners, as their name indicates, are optical elements that combine two or more light beams into a single overlapping composite beam. These are distinctly different optical elements from beam spacers which move light beams closer without combining the beams. A roof mirror is used to combine two beams in U.S. Pat. No. 5,519,432, commonly assigned as the present application and herein incorporated by reference.

Beam splitter prisms can be used as beam spacer elements but this approach reduces the intensity of the output beam by half due to light loss caused by splitting the beam. A tilt plate and a pair of beam steering prisms (or a second tilt plate) are used to split a wide horizontal beam into two smaller vertically aligned beams in U.S. Pat. No. 5,557,475 to improve the brightness symmetry of the beam.

One possible beam spacer is found in U.S. Pat. No. 5,566,024, commonly assigned as the present application and herein incorporated by reference. Two sets of two single blazed binary diffractive optical elements form a beam spacer for contracting two wider spaced parallel beams into two closely spaced parallel beams.

It is an object of the present invention to provide a multiple beam separation spacer of a beam splitter cube and two roof mirrors which controls the separation between four parallel laser beams.

SUMMARY OF THE INVENTION

According to the present invention, a beam splitter cube and two roof mirrors are used as a beam spacer. Each roof mirror will reflect two parallel laser beams to the beam splitter cube which will interlace and closely space the four parallel laser beams.

Other objects and attainments together with a fuller understanding of the invention will become apparent and appreciated by referring to the following description and claims taken in conjunction with the accompanying drawings.

DESCRIPTION OF THE INVENTION

Figure 1:
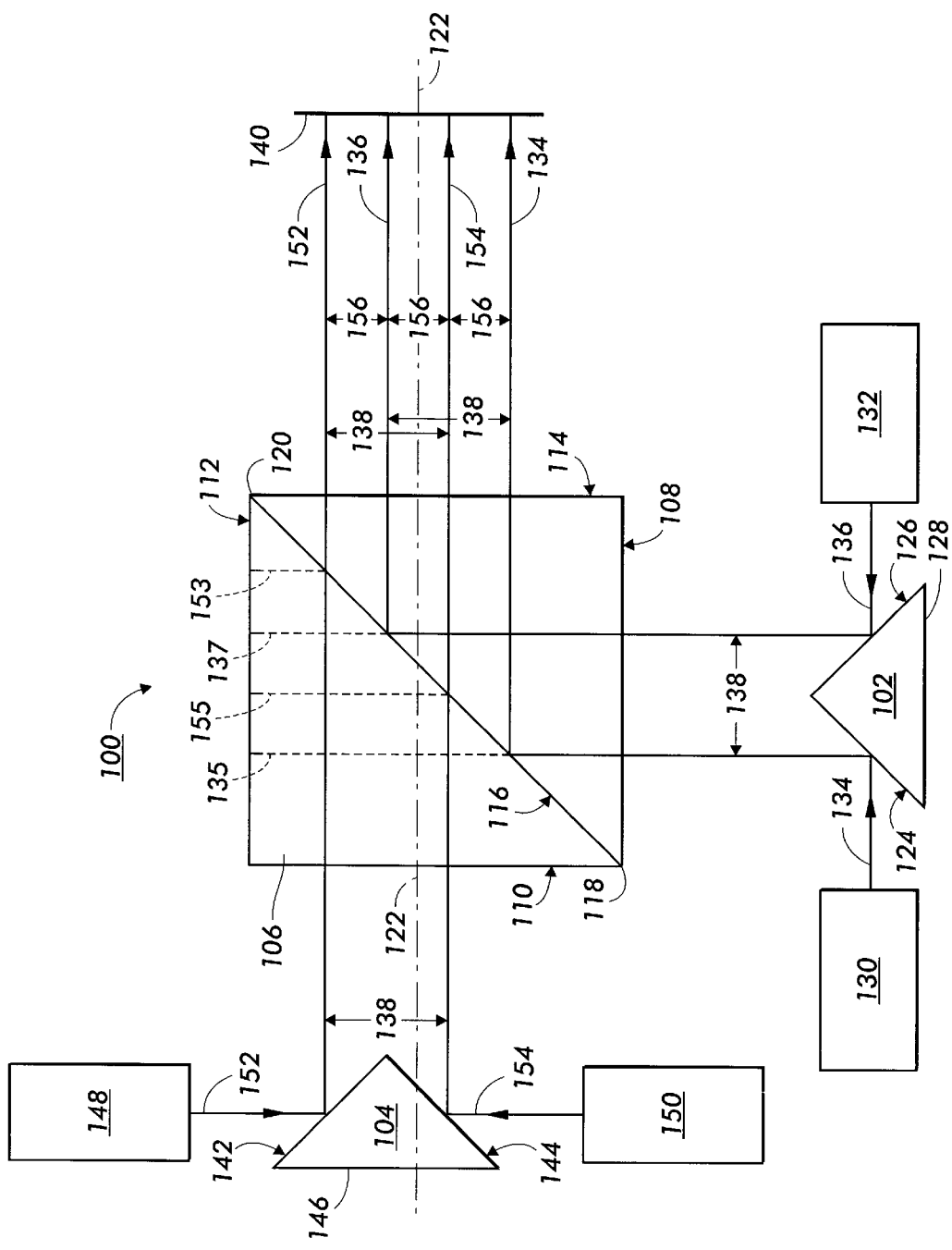
FIG. 1 illustrates a schematic view of the beam spacer with two roof mirrors and a beam splitter cube of the present invention.

Reference is now made to FIG. 1 illustrating the beam spacer 100 for spacing four laser beams of the present invention. The beam spacer 100 comprises a first roof mirror 102, a second roof mirror 104 and a beam splitter cube 106.

The first roof mirror 102 is adjacent to the first input surface side of 108 of the beam splitter cube 106. The second roof mirror 104 is adjacent to the second input surface side 110 of the beam splitter cube 106. The first and second input surface sides 108, 110 are at 90 degrees to each other. Opposite the first input surface side 108 of the beam splitter cube 106 is the optical block surface side 112. Opposite the second input surface side 110 of the beam splitter cube 106 is the output surface side 114. The partially reflective, partially transmissive surface 116 of the beam splitter cube 106 extends from the intersection corner 118 of the first and second input surface sides 108, 110 to the intersection corner 120 of the optical block surface side 112 and the output surface side 114.

An optical axis 122 extends through the beam splitter cube 106. The partially reflective, partially transmissive surface 116 is positioned at a 45 degree angle to the optical axis 122.

The first roof mirror 102 has a first reflective surface 124 and a second reflective surface 126 positioned at a 90 degree angle. The first roof mirror 102 is a right angle isosceles triangle with the hypotenuse 128 parallel to the first input surface side 108 of the beam splitter cube 106.

A first laser diode 130 and a second laser diode 132 are positioned on opposite sides of the first roof mirror 102.

The first laser diode 130 will emit a first laser beam 134. The second laser diode 132 will emit a second laser beam 136. The two laser beams 134 and 136 have the same wavelength.

The first laser beam 134 will reflect at a 90 degree angle from the first reflective surface 124 of the first roof mirror 102. The second laser beam 136 will reflect at a 90 degree angle from the second reflective surface 126 of the first roof mirror 102.

The two laser beams 134 and 136 after reflection from the first roof mirror 102 are parallel and separated by a first spacing distance 138. The two laser beams 134 and 136 after reflection from the first roof mirror 102 are perpendicular to the optical axis 122.

The first laser beam 134 is incident normal to the first input surface side 108 of the beam splitter cube 106. The first laser beam 134 will refract through the beam splitter cube 106 to the partially reflective, partially transmissive surface 116. The first laser beam 134 is incident at a 45 degree angle to the surface 116. A portion 135 of the first laser beam is transmitted through the surface 116 and will continue though the beam splitter cube 106 to the optical block surface side 112. A portion 134 of the laser beam will be reflected from the surface 116 parallel to the optical axis 122 and will continue through the beam splitter cube 106 to be incident normal to the first output surface side 114. The first laser beam 134 will refract through the surface 114 of the beam splitter cube 106, still parallel to the optical axis 122, to the external scan line 140. The scan line 140 is perpendicular to the optical axis 122.

The second laser beam 136 is also incident normal to the first input surface side 108 of the beam splitter cube 106. The second laser beam 136 will refract through the beam splitter cube 106 to the partially reflective, partially transmissive surface 116. The second laser beam 136 is incident at a 45 degree angle to the surface 116. A portion 137 of the second laser beam is transmitted through the surface 116 and will continue though the beam splitter cube 106 to the optical block surface side 112. A portion 136 of the laser beam will be reflected from the surface 116 parallel to the optical axis 122 and will continue through the beam splitter cube 106 to be incident normal to the first output surface side 114. The second laser beam 136 will refract through the surface 114 of the beam splitter cube 106, still parallel to the optical axis 122, to the external scan line 140.

The first laser beam 134 and the second laser beam 136 are still parallel at the scan line 140 after reflection from the beam splitter cube 106. The first laser beam 134 and the second laser beam 136 are still separated by the first spacing distance 138 at the scan line 140.

The second roof mirror 104 has a first reflective surface 142 and a second reflective surface 144 positioned at a 90 degree angle. The second roof mirror 104 is a right angle isosceles triangle with the hypotenuse 146 parallel to the second input surface side 110 of the beam splitter cube 106.

A third laser diode 148 and a fourth laser diode 150 are positioned on opposite sides of the second roof mirror 102.

The third laser diode 148 will emit a third laser beam 152. The fourth laser diode 150 will emit a fourth laser beam 154. The two laser beams 152 and 154 have the same wavelength as the first and second laser beams 134 and 136.

The third laser beam 152 will reflect at a 90 degree angle from the first reflective surface 142 of the second roof mirror 104. The second laser beam 154 will reflect at a 90 degree angle from the second reflective surface 144 of the second roof mirror 104.

The two laser beams 152 and 154 after reflection from the second roof mirror 104 are parallel and separated by a first spacing distance 138, the same spacing as between the first and second laser beams 134 and 136. The two laser beams 152 and 154 after reflection from the second roof mirror 104 are parallel to the optical axis 122.

The third laser beam 152 is incident normal to the second input surface side 110 of the beam splitter cube 106. The second laser beam 152 will refract through the beam splitter cube 106 to the partially reflective, partially transmissive surface 116. The second laser beam 152 is incident at a 135 degree angle to the surface 116. A portion 153 of the second laser beam is reflected from the surface 116 and will continue though the beam splitter cube 106 to the optical block surface side 112. A portion 152 of the laser beam will be transmitted through the surface 116 parallel to the optical axis 122 and will continue through the beam splitter cube 106 to be incident normal to the first output surface side 114. The third laser beam 152 will refract through the surface 114 of the beam splitter cube 106, still parallel to the optical axis 122, to the external scan line 140.

The fourth laser beam 154 is also incident normal to the second input surface side 110 of the beam splitter cube 106. The fourth laser beam 154 will refract through the beam splitter cube 106 to the partially reflective, partially transmissive surface 116. The fourth laser beam 154 is incident at a 135 degree angle to the surface 116. A portion 155 of the second laser beam is reflected by the surface 116 and will continue though the beam splitter cube 106 to the optical block surface side 112. A portion 154 of the laser beam will be transmitted through the surface 116 parallel to the optical axis 122 and will continue through the beam splitter cube 106 to be incident normal to the first output surface side 114. The fourth laser beam 154 will refract through the surface 114 of the beam splitter cube 106, still parallel to the optical axis 122, to the external scan line 140.

The third laser beam 152 and the fourth laser beam 154 are still parallel at the scan line 140 after reflection from the beam splitter cube 106. The third laser beam 152 and the fourth laser beam 154 are still separated by the first spacing distance 138 at the scan line 140.

The first laser beam, the second laser beam, the third laser beam and the fourth laser beam are parallel to the optical axis after reflection by the roof mirrors and reflection and transmission by the beam splitter cube. The first laser beam, the second laser beam, the third laser beam and the fourth laser beam are interlaced by the beam splitter cube such that, at the scan line, the sequence of beams is the first laser beam, the fourth laser beam, the second laser beam and the third laser beam. In this example, the first and fourth laser beam are symmetrical about the optical axis with the second and third laser beams.

The first laser beam 134 and the adjacent fourth laser beam 154 are separated by a second spacing distance 156 at the scan line 128. The second spacing distance 156, after the beams are reflected and transmitted by the beam splitter cube 106 of the beam spacer 100, is less than the first spacing distance 138 before the beam splitter cube 106 of the beam spacer 100. In this embodiment, the second spacing distance 156 is half that of the first spacing distance 138.

The fourth laser beam 154 and the adjacent second laser beam 136 are separated by the same second spacing distance 156, as between the first laser beam 134 and the fourth laser beam 154. The second laser beam 136 and the adjacent third laser beam 152 are also separated by the second spacing distance 156.

The angles of the reflective surfaces of the roof mirrors and the angles of reflection of the two beams to the roof mirrors need not be right angles. The only optical requirements are that the two beams reflected from the roof mirror be parallel and incident normal to the input surface of the beam splitter cube.

The beam spacer of the present invention will also closely space three or two beams with the present design.

The input and output surfaces of the beam splitter cube typically have an antireflection coating to increase refraction of the laser beam.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A beam spacer for closely spacing four parallel light beams comprising:

a first laser source for emitting a first light beam, a second laser source for emitting a second light beam, a first roof mirror for reflecting said first light beam and said second light beam, said first light beam and said second light beam being separated by a first spacing, said first light beam and said second light beam being parallel, a third laser source for emitting a third light beam, a fourth laser source for emitting a fourth light beam, a second roof mirror for reflecting said third light beam and said fourth light beam, said third light beam and said fourth light beam being separated by said first spacing, said third light beam and said fourth light beam being parallel, and a beam splitter cube for reflecting said first light beam and said second light beam from said first roof mirror to a scan line, said beam splitter cube for transmitting said third light beam and said fourth light beam from said second roof mirror to said scan line, said beam splitter cube interlacing said light beams at said scan line, whereby said first light beam and said fourth light beam are separated by a second spacing at said scan line, said fourth light beam and said second light beam are separated by said second spacing at said scan line, said second light beam and said third light beam are separated by said second spacing at said scan line, wherein said first light beam, said second light beam, said third light beam and said fourth light beam are parallel at said scan line and said second spacing is less than said first spacing.

* * * * *